United States Patent [19]

Daouk

[11] Patent Number: 5,433,320
[45] Date of Patent: Jul. 18, 1995

[54] CONTAINER INTENDED IN PARTICULAR FOR THE TRANSPORTING OF LOADS TO BE HANDLED WITH CARE

[76] Inventor: Antar Daouk, 27, Avenue du Marechal Lyautey, 75016 Paris, France

[21] Appl. No.: 215,207

[22] Filed: Mar. 21, 1994

Related U.S. Application Data

[63] Continuation of Ser. No. 957,517, Oct. 6, 1992, abandoned.

[51] Int. Cl.6 ............................................. B65D 85/68
[52] U.S. Cl. ................................. 206/335; 206/45.16
[58] Field of Search ................. 206/335, 45.16, 386; 248/455, 671; 254/124, 8 B, 8 R, 8 C; 414/754

[56] References Cited

U.S. PATENT DOCUMENTS

| 722,166 | 3/1903 | Taft | 254/8 R |
|---|---|---|---|
| 982,046 | 1/1911 | Flemming | 206/335 X |
| 1,839,291 | 1/1932 | Barbour | 248/455 X |
| 2,629,487 | 1/1953 | Kells et al. | 206/335 |
| 2,829,863 | 4/1958 | Gibson | 254/8 C |
| 3,608,990 | 9/1971 | Arlitt | 206/335 X |
| 3,794,350 | 2/1974 | Cwycyshyn et al. | 206/335 X |
| 4,343,401 | 8/1982 | Paulyson | 206/335 X |
| 4,458,370 | 7/1984 | Fickler | 248/455 X |
| 4,466,601 | 8/1984 | Raines | 248/455 X |
| 4,901,980 | 2/1990 | Hansen | 254/8 C X |

FOREIGN PATENT DOCUMENTS

| 0612468 | 10/1960 | Italy | 206/335 |
|---|---|---|---|
| 2050304 | 1/1981 | United Kingdom | 206/335 |

Primary Examiner—David T. Fidei
Assistant Examiner—Ted Kavanaugh
Attorney, Agent, or Firm—Anthony J. Casella; Gerald E. Hespos

[57] ABSTRACT

The present invention relates to a container of the type comprising two encasing elements (1, 2) which can be fitted one on the other in order to define the storage space for the load to be transported. According to the invention, this container includes within the storage space, at least one cradle (5) for the support of the load, articulated at one end (at 6) on a frame (4) securely fastened to the base of a first encasing element (1) in order to be capable of being displaced between a horizontal position on said frame and an erect position above the latter, after removal of the second encasing element (2), a crutch (9) for locking the support cradle in erect position being furthermore provided. This container is intended more particularly for the transportation of ejectable aircraft seats or any other load to be handled with care.

13 Claims, 3 Drawing Sheets

CONTAINER INTENDED IN PARTICULAR FOR THE TRANSPORTING OF LOADS TO BE HANDLED WITH CARE

This application is a continuation of application Ser. No. 07/957,517, filed Oct. 6, 1992, abandoned.

BACKGROUND AND SUMMARY OF THE INVENTION

The present invention relates to a container intended in particular for the transporting of loads which are to be handled with care, such as ejectable seats for aircraft, this container having two encasing elements which can be fitted one on the other in order to define the storage space of the load to be transported, Containers of this type are known which are used in aeronautics for the transporting of ejectable seats from the place of manufacture to the place of installation within the cockpits of airplanes.

These ejectable seats being fastened in operating condition on their mounting frame, their placement in and extraction from the container require delicate, constraining and dangerous maneuvers which increase the time for the carrying out thereof, increase the cost of loading and unloading and expose the personnel to the danger of accidents.

The same problems arise with any other load which is to be handled with care or with heavy loads or loads of large dimensions.

The object of the present invention is to remedy these drawbacks and, for this purpose, it relates to a container of the type specified above which is characterized by the fact that it comprises, within its storage space, at least one support cradle for the load, articulated at one end on a frame rigidly secured to the base of a first encasing element, in order to be able to be moved between a lying-down position on said frame and an erect position above the frame after the withdrawal of the second encasing element, means for locking the support cradle in erect position being furthermore provided.

Thus, on the one hand, the load, in place in the first encasing element, can be brought into erect position, at least to a large extent outside of the latter, which facilitates its removal since it is more accessible and is substantially at man's height; on the other hand, it is easy to present a load in order to fasten it on the support cradle which is in erect position, and the load can then be easily placed within the first encasing element by moving the cradle into its horizontal position.

In accordance with one simple embodiment, the locking means comprise at least one foldable and lockable crutch articulated on one side to the frame and on the other to the support cradle, at a point remote from its articulated end.

Two self-extending jacks are preferably furthermore provided, each arranged between the frame and a respective side of the support cradle and near the articulated end of the latter.

The presence of these jacks facilitates the lifting of the load from the horizontal position of the cradle and dampens the descent of said load from the erect position of said cradle.

On the frame, there is preferably provided a notched sector which is centered on the cradle-frame articulation, cooperating with a disengageable pawl mounted on the cradle so as to enable the raising and lowering of the loaded support cradle step by step, and thus to prevent the danger of a sudden falling of the cradle before it has been locked in the erect or horizontal position.

The support cradle advantageously bears a moveable pawl disengagement handle connected to the pawl by a cable and placed in the vicinity of an operating handle fastened on the free end of the support cradle. The pawl disengagement handle can thus be easily actuated by the operator by taking in hand the fixed maneuvering handle upon manipulation of the support cradle.

In accordance with another feature of the invention, the container is provided with means for locking the support cradle in horizontal position on the frame.

This makes it possible to stabilize the load which is itself attached to the cradle during the transportation of the container.

In accordance with a preferred embodiment of the invention, the frame consists of two substantially parallel rails between which the support cradle is articulated, the cradle comprising, on each of its sides, a U-shaped iron which is open in the direction of a respective rail of the frame, in order to surround it in the horizontal position of the support cradle, and the means for the locking of the latter consisting of pins, each intended to retain a respective U-iron astride over the corresponding rail.

Thus, the locking of the load support cradle may be effected very simply on the frame.

For the fastening of the load on the support cradle, the latter advantageously has, at at least one of its ends, a releasable clamping grip which is intended to cooperate with a protruding part of the load.

In accordance with an additional feature of the invention, the support cradle is provided, on its load receiving face, with blocks serving provisionally to immobilize the load before the clamping or after the unclamping of the grips.

The height of the first encasing element is preferably less than that of the second encasing element. Thus, the loads are very easy to grasp or put in place and the forces are reduced to a minimum.

DETAILED DESCRIPTION OF THE PREFERRED EMBODIMENT

Figure 1:
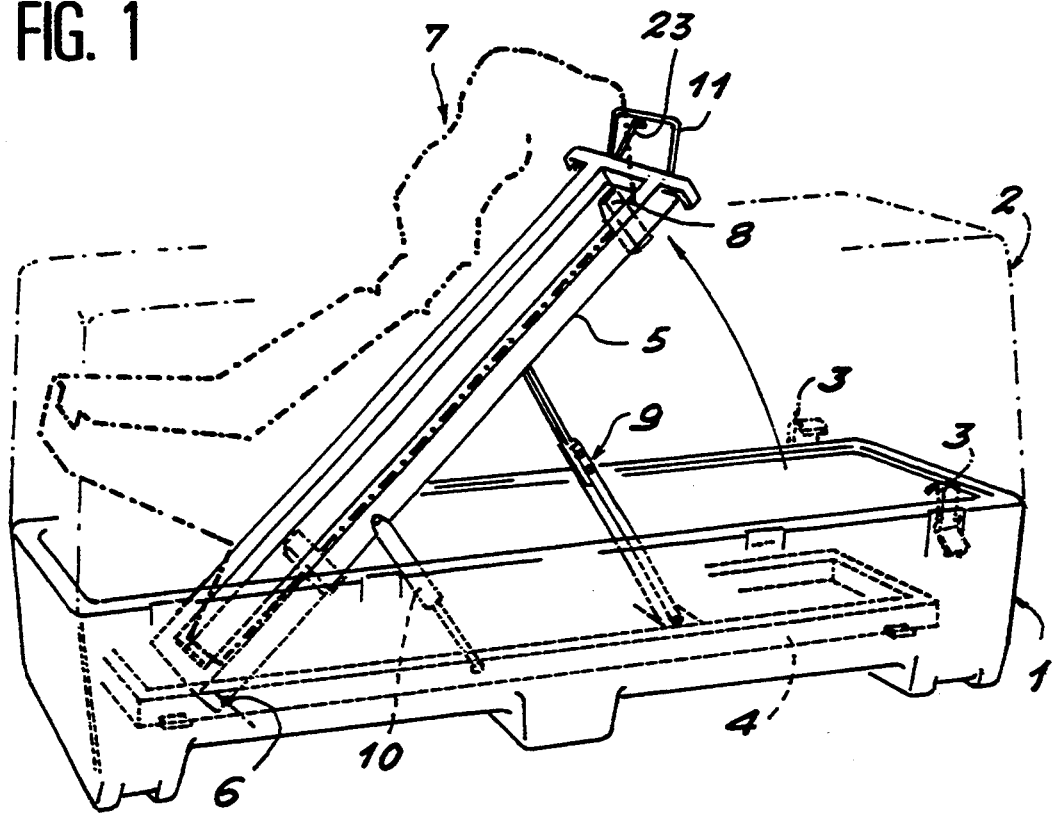
FIG. 1 is an overall view of a container with its cradle in erect position.

FIG. 1 shows a container comprising a first encasing element 1 in solid lines of a height of about 40 cm and a second encasing element 2 of a height of about 1 meter shown partially in dot-dash lines.

During transportation, the two encasing elements 1, 2 are locked to each other in known manner, for instance by means of attachments 3.

Within the inner encasing element 1 there is fastened a rectangular frame 4 shown partially in dotted lines.

On the frame, there is articulated a cradle 5 of generally rectangular shape the articulation 6 of which is located in the vicinity of one of the small sides of the frame.

On the cradle there rests a load 7, an ejectable airplane seat having been shown diagrammatically here.

This seat is held in position in particular by blocks 8 welded on the cradle, which engage freely in recesses in the back of the seat.

At a point distant from the frame-cradle articulation there is fastened a foldable and lockable crutch 9. The crutch 9, in its turn, is articulated on one side on the frame and on the other side on the back of the cradle. The crutch 9, once locked, immobilizes the cradle in the erect position. Self-extendable jacks 10, interposed between the frame and a respective side of the cradle, are arranged between the frame/cradle point of articulation and the crutch/frame point of articulation.

An operating handle 11 is fastened on the small side of the cradle opposite the cradle/frame articulation.

Figure 2:
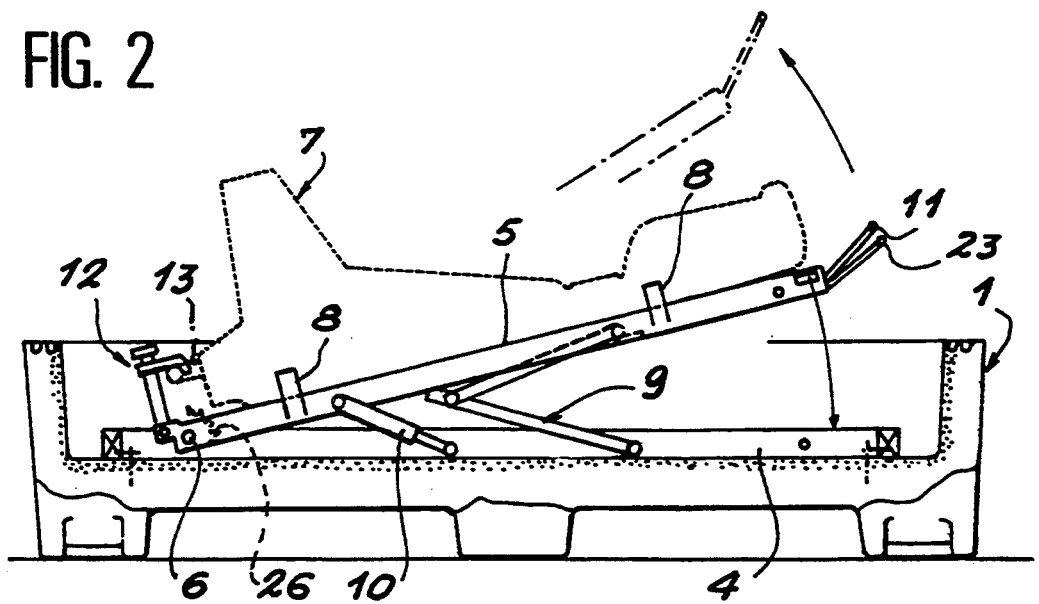
FIG. 2 is a side view of the container partially torn away, the cradle being in intermediate position between the horizontal position and the erect position.

The same main component elements as described above are found again in FIG. 2.

In this figure, the cradle 5 is shown in a position intermediate between the horizontal position and the erect position.

It is furthermore seen that a clamping grip 12 is fastened on the cradle at the end located in the vicinity of the cradle/frame articulation, this clamping grip being releasable and cooperating with an end protruding part 13 of the ejectable seat.

Figure 3:
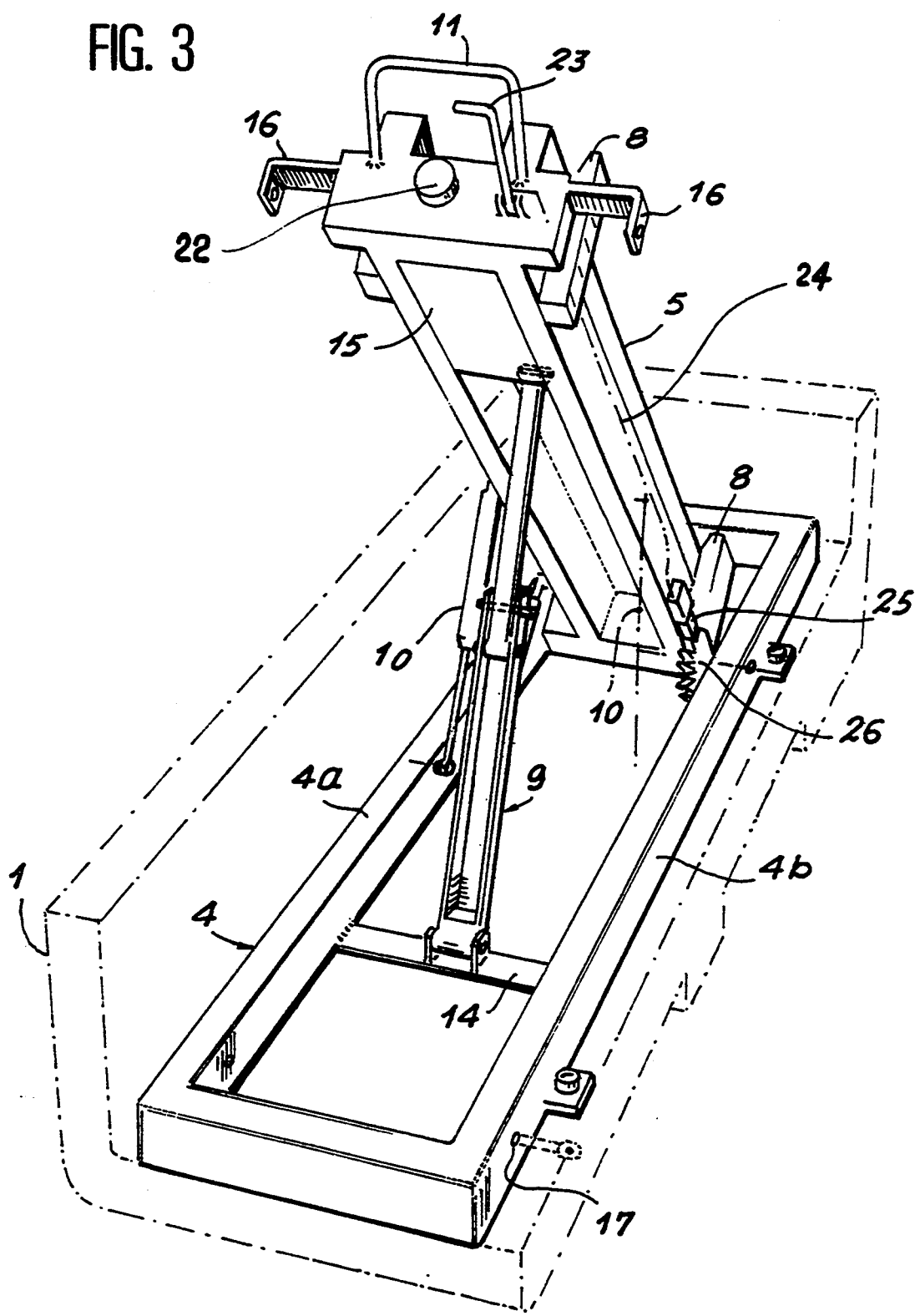
FIG. 3 is a perspective view on a larger scale, the cradle being in erect position.

FIG. 3 shows the frame 4 bolted on the bottom of the lower encasing element 1 of the container. The frame is formed of tubes of square cross section, two of them defining longitudinal lateral rails 4a, 4b, between which the cradle is articulated at one of its ends. The cradle 5 is also formed of metal tubes and has dimensions smaller than the dimensions of the frame, in order to fit within the latter in horizontal position.

On the frame there is welded a bar 14 which comes to rest on the two inner faces of the rails 4a, 4b of said frame. On the bar there is articulated one branch of the foldable crutch 9, the other branch of which is articulated on a plate 15 on the back of the cradle. About midway between the frame/cradle articulation 6 and the bar 14, there is articulated within each rail 4a, 4b of the frame, one end of a corresponding self-extendable jack 10, the other end of which is articulated on the outer part of the cradle sides.

A moveable handle 23 is fastened on the free small side of the cradle 5, in the vicinity of and below the operating handle 11; it is connected by a cable 24 to a releasable pawl 25 placed on the cradle, which pawl cooperates with a notched sector 26 rigidly secured to the frame and centered on the axis of articulation 6 of the cradle.

The handle 11, which is welded to the free end of the cradle, makes it possible to maneuver the latter either towards the raised position or towards the folded position. In this latter position, the cradle 5 can be laid down and locked on the frame 4 by means of two U-irons 16 welded on both sides of its free end; each of these U-irons 16 is open in the direction of a respective side rail 4a or 4b of the frame and can be locked on the latter by means of a pin 17 passing through perforations provided in the outer flange of the U-iron 16 and in the rail 4a or 4b.

Figure 4:
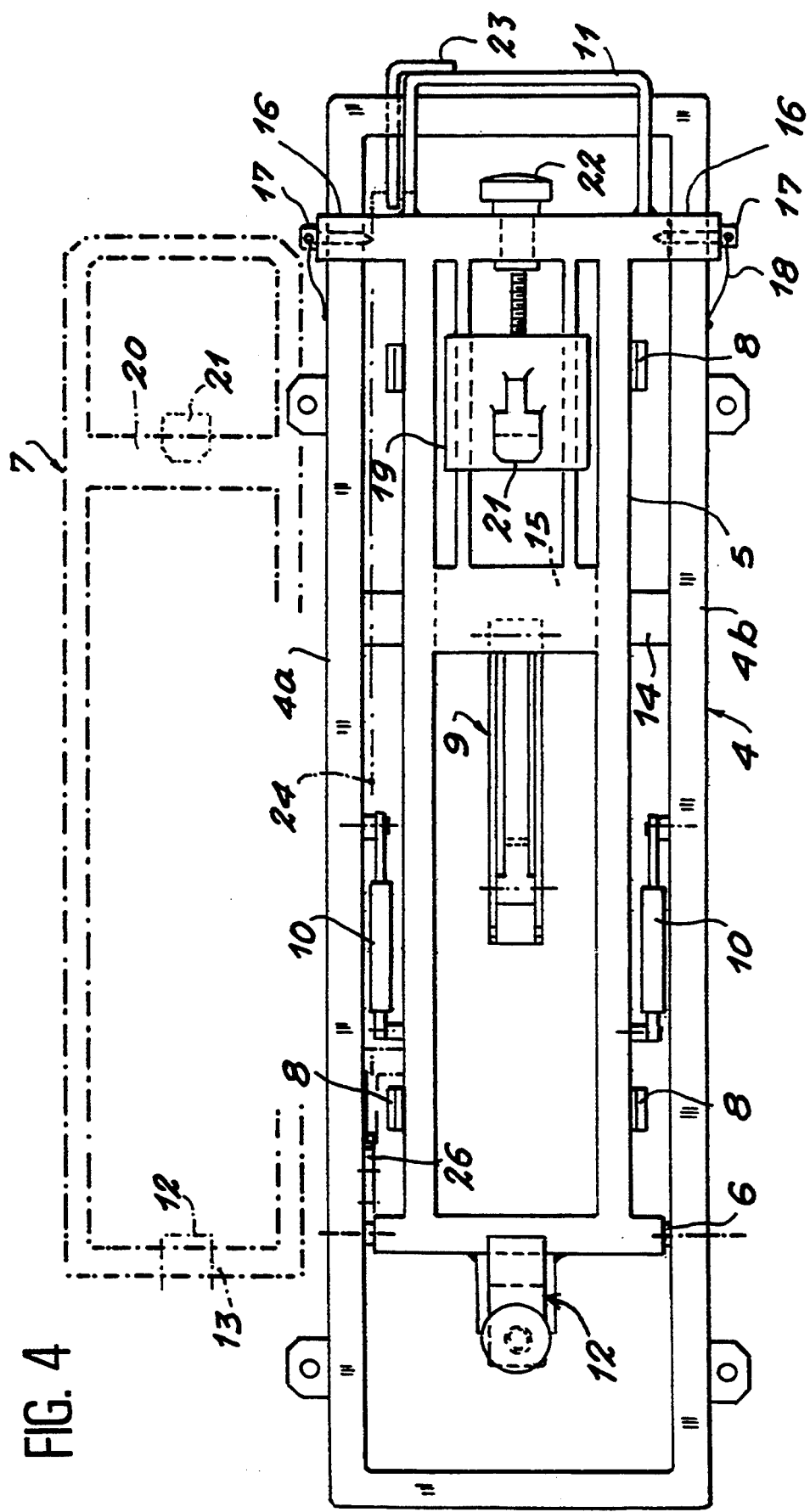
FIG. 4 is a top view of the cradle in horizontal position resting on the frame.

The cradle which is thus placed in horizontal position and locked within the frame is shown in FIG. 4. In this figure there can be noted, at the free end of the cradle 6, the clamping grip 12 which cooperates with the end protruding part 13 of the ejectable seat, only the back of which has been shown in dot-dash lines and which is placed, for convenience in reading, alongside of the drawing of the cradle. At the other end of the cradle, that is to say, at the free end, there can be noted a device 19 which makes it possible to fasten the opposite end part 20 of the back of the ejectable seat by means of another clamping grip 21 which is longitudinally adjustable by a screw 22, which can also be noted in FIG. 3. This makes it possible to fasten ejectable seats of different sizes on the cradle.

The container which has just been described is used in the following manner: it is assumed, first of all, that the ejectable seat 7 shown diagrammatically in dot-dash lines in FIG. 4 is in position on the cradle 5, which is locked on the frame 4 within the container. The upper part 2 of the container having been removed, it is sufficient to withdraw the locking pins 17 of the cradle and then, by means of the handle 11, to lift the cradle either manually or by machine in order to bring it from the folded position to the erect position shown in FIG. 1 or in FIG. 3, passing through intermediate positions such as the one illustrated in FIG. 2. During the raising of the cradle, which is facilitated by the action of the self-extendable jacks, the pawl 25 engages in succession in each of the notches of the sector 26 so that any accidental descent of the cradle is prevented, the release of the pawl 25 not being able to take place except as a result of pressure exerted on the handle 23. The cradle being in erect position, it is then sufficient to lock the foldable crutch 9 in its unfolded position by means, for instance, of a pin inserted in the vicinity of the folding shaft of the crutch and the load can then be removed after having unclamped the grips 12, 21.

The opposite maneuver is effected in the following manner: the ejectable seat having been put in place between the blocks, the clamping grips 12, 21 present at the ends of the cradle are actuated and the ejectable seat is thus stowed on the cradle. The foldable crutch is then unlocked, whereupon the release handle 23 is actuated to remove the pawl 25 from the sector 26 and the cradle is allowed to descend gradually, it pivoting around its articulation 6, and the jacks exerting a dampening action on the descent, which can furthermore be controlled due to the handle 11 which is held either manually or mechanically. As a safety measure, the lowering of the cradle 5 can also be effected step by step by only intermittently actuating the release handle 23. When the cradle has reached the horizontal position, the U-irons are engaged on the respective cross members of the frame and the locking of the cradle on the frame can then be effected by means of the pins 17 provided for this purpose.

The present invention makes it possible to solve the problems raised upon the putting in place or the removal of ejectable seats intended to be transported in containers.

The present description is a non-limitative example of the invention of the applicant, the applications of which are not limited to ejectable seats, but can extend to the transportation of any other load which is difficult to handle.

I claim:

1. A container for transporting an ejectable seat for aircraft, said container comprising:
   a lower encasing element having at least a bottom wall;
   a frame securely attached to the bottom wall of the lower encasing element, said frame comprising opposed first and second longitudinal ends;
   an ejectable aircraft seat cradle disposed in a nested position with said frame and substantially adjacent said bottom wall of said lower encasing element, said cradle having opposed first and second ends, the first end of said cradle being articulated to the first end of said frame such that said second end of said cradle can be pivoted from said nested position into an erect position where said second end of said cradle is at an erect height above said bottom wall of said lower encasing element;

locking means for releasably locking said cradle in said erect position; and an upper encasing element releasably engaged with said lower encasing element to define an enclosure therebetween, said enclosure enclosing said frame and said cradle in said nested position with said frame, said upper encasing element comprising a top wall spaced from said bottom wall of said lower encasing element by an enclosure height, said enclosure height being less than said erect height, such that said upper encasing element must be separated from said lower encasing element to pivot said cradle into said erect position.

2. A container as in claim 1, wherein said locking means is a first locking means, and wherein said container further comprises a second locking means for releasably locking an ejectable aircraft seat to said cradle.

3. A container as in claim 2, further comprising third locking means for releasably locking said cradle in said nested position.

4. A container as in claim 1, further comprising means for moving said cradle between said nested position and said erect position.

5. A container as in claim 1, wherein said lower encasing element comprises a plurality of interconnected side walls connected to and extending from said bottom wall, said side walls being dimensioned to substantially enclose said cradle when said cradle is in said nested position.

6. A container for transporting an ejectable seat for aircraft, said container comprising first and second encasing elements (1, 2) which can be fitted one on the other to define a storage space therebetween for the seat to be transported, characterized by the fact that said container comprises, within said storage space, a frame (4) secured to the first encasing element (1) a cradle (5) having a top surface for releasable clamped engagement of the ejectable seat, said cradle having an end articulated to said frame for displacement between a horizontal position on said frame and an erect position wherein portions of said cradle extend above the frame, and above the first encasing element after withdrawal of the second encasing element (2) from the first encasing element (1), and means for locking the support cradle in the erect position the locking means comprising at least one foldable and lockable crutch (9) hingedly connected to the frame and on the cradle (5) at points distant from the articulation between the cradle and the frame, two self-extendable jacks (10) being provided between the frame and the support cradle at locations between the articulated end and the crutch, and a notched sector (26) centered on the articulation (6) between the cradle and the frame and a releasable pawl (25) mounted on the cradle for releasable engagement with the notched sector to hold the cradle in the erect position.

7. A container according to claim 6, characterized by a moveable handle (23) connected to the pawl by a cable (24) for selective release of the pawl from the notched sector and an operating handle (11) fastened on an end of the support cradle opposite the articulation to the frame.

8. A container according to claim 7, characterized by means for locking the support cradle in the horizontal position on the frame.

9. A container according to claim 8, characterized by the fact that the frame (4) comprises two substantially parallel rails between which there is articulated the support cradle, said cradle having opposed sides, and on each of its sides, a U-iron (16) open towards the respective rail (4a, 4b) of the frame, each said U-iron being dimensioned to surround the respective rail in the horizontal position of the support cradle, and the means for locking the cradle comprises pins (17) each dimensioned to retain a respective U-iron on the corresponding rail.

10. A container according to claim 9, characterized by the fact that the cradle comprises, at at least one of its ends, a releasable clamping grip (12) for engaging a protruding part of the seat to lock the seat on said cradle.

11. A container according to claim 10, characterized by the fact that the support cradle (5) is provided with blocks (8) engageable with the seat for provisionally immobilizing of the seat.

12. A container according to claim 11, characterized by the fact that the height of the first encasing element (1) is definitely less than the height of the second encasing element (2).

13. An ejectable seat for aircraft and a container for transporting the ejectable seat for aircraft, said container comprising:

a lower encasing element having at least a bottom wall;

a frame securely attached to the bottom wall of the lower encasing element, said frame comprising opposed first and second longitudinal ends;

a cradle disposed in a nested position with said frame and substantially adjacent said bottom wall of said lower encasing element, said cradle having opposed first and second ends, the first end of said cradle being articulated to the first end of said frame such that said second end of said cradle can be pivoted from said nested position into an erect position;

the ejectable aircraft seat being releasably locked to said cradle, said seat defining an erect height above said bottom wall of said lower encasing element when said cradle is pivoted into said erect position;

locking means for releasably locking said cradle in said erect position; and an upper encasing element releasably engaged with said lower encasing element to define an enclosure therebetween, said enclosure enclosing said frame, said cradle in said nested position with said frame, and said ejectable aircraft seat on said cradle, said upper encasing element comprising a top wall spaced from said bottom wall of said lower encasing element by an enclosure height, said enclosure height being less than said erect height of said ejectable aircraft seat from said bottom wall when said cradle is in said erect position such that said upper encasing element must be separated from said lower encasing element to pivot said cradle and said ejectable aircraft seat into said erect position of said cradle.

* * * * *